United States Patent
Saiki et al.

(10) Patent No.: US 6,900,937 B2
(45) Date of Patent: May 31, 2005

(54) OPTICAL ELEMENT, POLARIZING PLATE AND METHOD FOR MANUFACTURING THEREOF, PROTECTIVE FILM FOR OPTICAL ELEMENT, OPTICAL FILM USING OPTICAL ELEMENT, AND VISUAL DISPLAY

(75) Inventors: Yuuji Saiki, Ibaraki (JP); Hiroe Maeda, Ibaraki (JP); Shuuji Yano, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 69 days.

(21) Appl. No.: 10/198,175

(22) Filed: Jul. 19, 2002

(65) Prior Publication Data

US 2003/0021025 A1 Jan. 30, 2003

(30) Foreign Application Priority Data

Jul. 19, 2001 (JP) ........................................ 2001-219652
Jan. 15, 2002 (JP) ........................................ 2002-005806

(51) Int. Cl.[7] ................................................ G02B 5/30
(52) U.S. Cl. ...................... 359/490; 359/485; 264/1.34; 252/585
(58) Field of Search ................................. 359/490, 483, 359/485, 491, 492; 156/99; 264/1.31, 1.34; 252/585

(56) References Cited

U.S. PATENT DOCUMENTS 6,008,940 A * 12/1999 Michihata et al. .......... 359/483
6,489,021 B2 * 12/2002 Yamamoto et al. ......... 428/336
6,726,995 B2 * 4/2004 Ishii et al. ................ 428/424.4
2003/0091792 A1 * 5/2003 Ishii et al. .................. 428/142

FOREIGN PATENT DOCUMENTS

| JP | 57066407 A | * 4/1982 | ............ G02B/5/30 |
| JP | 58011576 A | * 1/1983 | ............ C09J/3/16 |
| JP | 07294732 A | * 11/1995 | ............ G02B/5/30 |
| JP | 2000321430 A | * 11/2000 | ............ G02B/5/30 |
| JP | 2001-64601 | 3/2001 | |
| JP | 2001272544 A | * 10/2001 | ............ G02B/5/30 |
| WO | WO 97/47467 | 12/1997 | |
| WO | WO 200148519 A1 | * 7/2001 | ............ B32B/1/00 |

OTHER PUBLICATIONS

English Translation of Official Letter issued by Taiwan Patent Office (Date of Receipt: Sep. 22, 2004).
Taiwan Patent Office Action dated Feb. 5, 2004.

* cited by examiner

*Primary Examiner*—Thong Nguyen
*Assistant Examiner*—Arnel C. Lavarias
(74) *Attorney, Agent, or Firm*—Westerman, Hattori, Daniels & Adrian LLP

(57) ABSTRACT

A polarizing plate comprising a polarizer and a transparent protective film at least one surface of the polarizer via an adhesive layer, wherein an applied layer comprising a polymer having a hydroxyl group is formed on a surface of the transparent protective film that is adhered to the polarizer, and the adhesive layer is formed by an adhesive comprising an isocyanate adhesive, has no problem concerning saponification processing and has a good adhesive property between a polarizer and a transparent protective film.

21 Claims, 1 Drawing Sheet

OPTICAL ELEMENT, POLARIZING PLATE AND METHOD FOR MANUFACTURING THEREOF, PROTECTIVE FILM FOR OPTICAL ELEMENT, OPTICAL FILM USING OPTICAL ELEMENT, AND VISUAL DISPLAY

BACKGROUND OF THE INVENTION

1. Field of the Invention

The present invention relates to a polarizing plate and a method for manufacturing the same. Further, the present invention relates to a protective film for polarizing plate. The polarizing plate of the invention can be used independently or as an optical film laminating the plate and form a visual display, such as a liquid crystal display, an organic electroluminescent (EL) display or plasma display panel (PDP).

2. Description of the Related Art

In a liquid crystal display, it is indispensable that polarizers should be arranged at both sides of a glass substrate that forms a top surface of a liquid crystal panel according to a picture formation method. Generally, polarizing plate laminating a polarizer, comprising a polyvinyl alcohol derived film and a dichroism substance such as iodine, and a transparent protective film such as triacetyl cellulose film is used.

The above described polarizing plate is manufactured by laminating a polarizer and a transparent protective film by adhesives. As the above-mentioned adhesives, for example, aqueous solution including polyvinyl alcohol and a cross-linking agent, and isocyanate derived adhesives, etc. are used. However, adhesion between a triacetyl-cellulose film used as the above-mentioned transparent protective film and the above-mentioned adhesives is not enough. Therefore, a triacetyl-cellulose film whose surface is saponified to improve adhesive property by being dipped in alkaline solution is used.

However, since a high-concentration alkali solution is used in saponification processing, it is accompanied by danger, and also has a large load to equipment, and thereby troubles, such as failure, may be easily induced. Moreover, when saponification processing is performed for a long time, concentration of an alkali solution used may be decreased and the adhesive improving effect by the saponification processing may often become inadequate. Furthermore, in disposal of a spent-caustic solution, there were problems, such as causing of a large quantity of wastewater.

SUMMARY OF THE INVENTION

An object of the present invention is to provide an optical element, in particular a polarizing plate, which has no problem concerning saponification processing and has a good adhesive property between a polarizer and a transparent protective film, and a method for manufacturing the same.

Another object of the present invention is to provide a transparent protective film used for the polarizing plate concerned. Still another object of the present invention is to provide an optical film in which the polarizing plate is laminated and a visual display.

The present inventors devoted extensive study for solving the problem described above and consequently found that the objects described above can be achieved by using a polarizing plate and a method for manufacturing the same described below, thus arriving at completion of the present invention. That is, the present invention is as follows:

1. A polarizing plate comprising a polarizer and a transparent protective film adhered to at least one surface of the polarizer via an adhesive layer,
wherein an applied layer comprising a polymer having a hydroxyl group is formed on a surface of the transparent protective film that is adhered to the polarizer, and
the adhesive layer is formed by an adhesive comprising an isocyanate adhesive.
2. The polarizing plate according to above-mentioned 1, wherein the transparent protective film is a triacetyl cellulose film.
3. The polarizing plate according to above-mentioned 1, wherein the transparent protective film has an optical elasticity coefficient of $30 \times 10^{-12}$ m$^2$/N or less.
4. The polarizing plate according to above-mentioned 1 to 3, wherein the polymer having the hydroxyl group is an ethylene-vinyl alcohol copolymer.
5. The polarizing plate according to above-mentioned 1 to 3, wherein the applied layer comprising the polymer having the hydroxyl group is formed by a polymer solution or a dispersion containing a solvent dissolving a material of the transparent protective film.
6. The polarizing plate according to above-mentioned 1 to 3, wherein an isocyanate adhesive is an aqueous dispersion isocyanate adhesive.
7. A method for manufacturing the polarizing plate according to above-mentioned 1 to 3, which comprises a polarizer and a transparent protective film at least one surface of the polarizer via an adhesive layer, comprising;
forming an applied layer comprising a polymer having a hydroxyl group on a surface of the transparent protective film that is adhered to the polarizer, and
laminating the applied layer and the polarizer by using an isocyanate adhesive.
8. A protective film for a polarizing plate used for the polarizing plate according to above-mentioned 1 to 3,
wherein an applied layer comprising a polymer having a hydroxyl group is formed on a surface of the transparent protective film that is adhered to the polarizer.
9. An optical film comprising at least one sheet of the polarizing plate according to above-mentioned 1 to 3.
10. A visual display using the polarizing plate according to any of above-mentioned 1 to 3.
11. An optical element comprising an optical layer and a transparent protective film adhered to at least one surface of the optical layer via an adhesive layer,
wherein an applied layer comprising a polymer having a hydroxyl group is formed on a surface of the transparent protective film that is adhered to the optical layer, and the adhesive layer is formed by an adhesive comprising an isocyanate adhesive.

The optical layer may comprise a polarizing plate, for example, a linear reflective polarizer or a circular reflective polarizer, or it may include no polarizing element.

In the above-mentioned polarizing plate of the present invention, instead of saponifying the surface of a transparent protective film, easy adhesive property is given to the surface of the transparent protective film by forming an applied layer constituted with a polymer having hydroxyl groups on a surface of a transparent protective film, and the easy adhesive surface of the protective film and a polarizer are adhered using isocyanate adhesives. The isocyanate groups of the isocyanate adhesives reacted, respectively, with the hydroxyl groups of the surface of the protective film (the above described applied layer) and the polarizer, and thereby adhesive property between the polarizer and the protective film improves without saponifying the surface of the protective film. Moreover, the polarizing plate obtained in the way has also a good water resisting property.

DESCRIPTION OF THE PARTICULAR EMBODIMENTS

Figure 1:
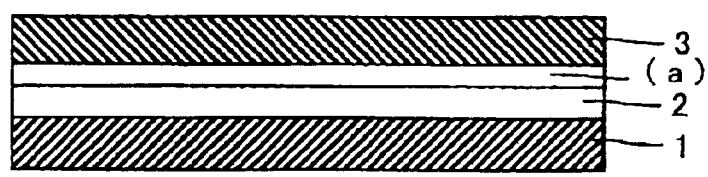
FIG. 1 shows an example of a polarizing plate of the present invention.

In an embodiment of a polarizing plate of the present invention, as shown in FIG. 1, a protective film 3 is formed on at least one surface of a polarizer 1 via an adhesive layer 2 formed by isocyanate adhesives. On the protective film 3, an applied layer (a) comprising a polymer having hydroxyl groups is formed, and the above described applied layer (a) is provided on the surface adhered with a polarizer 1 of a protective film 3. In FIG. 1, although the protective film 3 is formed only on one side of the polarizer 1, the protective film 3 may be prepared on both sides of the polarizer 1.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared in one side or both sides of the above-mentioned polarizer, with outstanding transparency, mechanical strength, heat stability, moisture cover property, isotropy, etc. may be preferable. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as polymethylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a film comprising resins of heat curing type or ultraviolet curing type, such as acrylics type, urethane type, acrylics urethane type and epoxy type and silicone type type may be mentioned.

Generally, thickness of the transparent protective film is no more than 500 μm, preferably 1 to 300 μm and more preferably 5 to 200 μm.

As a transparent protective film, cellulose type polymers, such as triacetyl cellulose, is preferable by reason of polarization characteristics and durability etc. Especially triacetyl cellulose film is preferable.

Moreover, as a protective film, a film whose optical elasticity coefficient shows no more than $30 \times 10^{-12}$ $m^2/N$ is suitable, since the irregularity by distortion of a base material generated by shrinkage of a polarizing plate is small. As a material whose optical elasticity coefficient shows no more than $30 \times 10^{-12}$ $m^2/N$, norbornene derived resins, olefin derived resins, polyimide resins etc. may be mentioned. A preferable optical elasticity coefficient of a protective film is no more than $10 \times 10^{-12}$ $m^2/N$, and further it is preferable to show no more than $5 \times 10^{-12}$ $m^2/N$ in respect of inhibition of generating of an irregularity. In addition, an optical elasticity coefficient represents a value measured based on a retardation when a stress is applied to a film. Specifically, a measurement of an optical elasticity coefficient is based on a measuring method indicated by the Tokyo Metropolitan Institute of Technology Memoirs vol. 10, page 54 to page 56 (1996.12).

In addition, when transparent protective film is prepared on both sides of the polarizer, the transparent protective film consisting of the same polymer material may be used on the front and the backside, or the transparent protective films consisting of different polymer materials etc. may be used.

On the surface of a transparent protective film that is adhered to a polarizer, an applied layer comprising a polymer having hydroxyl groups is formed. A thickness of the applied layer comprising the polymer having hydroxyl groups concerned is usually approximately 0.01 to 10 μm, preferably approximately 0.05 to 5 μm, and more preferably approximately 0.1 to 1 μm.

As a polymer having hydroxyl groups, there is specifically no limitation as long as it has hydroxyl groups in molecule, for example, ethylene-vinyl alcohol copolymers and polyvinyl alcohol may be mentioned, and in addition, resins that has hydroxyl groups in side chains or in terminal groups, such as polyester resins, epoxy resins, acrylic resins, urethane resins, etc., may be mentioned. Among them, since it demonstrates an excellent adhesive property, an ethylene-vinyl alcohol copolymers are preferable. In addition, in order that hydroxyl groups in the polymer demonstrate sufficient adhesive property by a reaction with the isocyanate groups in isocyanate adhesives, the polymer whose hydroxyl value is suitably approximately 30 to 50.

In formation of an applied layer comprising polymer having hydroxyl groups, various kinds of means may be used, and it is preferable to use a solution or a dispersion of the polymer. As a solvent used for preparation of a solution or dispersion of the polymer, especially a solvent that dissolve a transparent protective film material is preferable. When an applied layer is formed by a solution or dispersion using the solvent concerned, a transparent protective film material is dissolved in the solvent, applied as a thin layer, and dried. Thereby, a surface of the transparent protective film is dissolved to form a layer in which the transparent protective film material and the polymer having hydroxyl groups are mixed in the transparent protective film surface, and thus adhesion is improved between the transparent protective film and the polymer having hydroxyl groups.

The above described solvent may be suitably selected according to the transparent protective film material, and for example, when a transparent protective film material is a triacetyl cellulose, solvents, such as dimethylacetamide, acetone, cyclohexanone, methylene chloride, and ethyl acetate, etc. and mixture thereof may be mentioned. A polymer solution or dispersion usually contains the polymer approximately 0.01 to 10% by weight. A polymer solution is formed as an applied dry layer etc.

As the opposite side of the polarizing-adhering surface above-mentioned transparent protective film (non-applied side), a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

The adhesives containing isocyanate adhesives are used in adhesion processing between the above described polarizer and the transparent protective film. As isocyanate adhesives, polyfunctional isocyanate compounds, such as a compound including isocyanate groups at end groups, or prepolymers (urethane prepolymers) or resins having isocyanate groups at end groups, maybe used without any limitation. These isocyanate adhesives may be used in any forms of one-component or two-components system. Moreover, the above described isocyanate adhesives may also be used as aqueous dispersion isocyanate adhesives dispersed in water by blocking end isocyanate groups etc. It is suitable to use aqueous dispersion isocyanate adhesives in the present invention.

As the above described polyfunctional isocyanate compounds, for example; 2,4-tolylene diisocyanate, 2,6-tolylene diisocyanate, xylylene diisocyanate, 1,3-bisisocyanate methylcyclohexane, hexamethylene diisocyanate, tetramethylxylylene diisocyanate, m-isopropenyl alpha, alpha-dimethyl benzyl isocyanate, methylene-bis-4-phenyl isocyanate, p-phenylene diisocyanates or dimers thereof; and trimers, such as tris(6-isocyanate hexyl)isocyanurate; furthermore, biuret compounds thereof, reaction products with polyhydric alcohols, such as a trimethylol propane, or polyamines, etc. may be mentioned. As the above described polyfunctional isocyanate compounds, in order to avoid after-yellowing of an adhesive layer, aliphatic isocyanates are preferable. Moreover, as the above described polyfunctional isocyanate compounds, compounds having three or more isocyanate groups, such as, tris(6-isocyanate hexyl)isocyanurate is preferable.

Moreover, in order to increase reactivity of isocyanate groups, a reaction catalyst may be used to the above described isocyanate adhesives. As reaction catalysts, triethylamine, cobalt naphthenate, benzyl trimethyl ammonium hydroxide, stannous chloride, stannic chloride, tetra-n-butyl tin, tri-n-butyl tin acetate, n-butyl tin trichloride, trimethyl tin hydroxide, dimethyl tin dichloride, and dibutyl tin dilaurate etc. may be mentioned.

Moreover, the above described isocyanate adhesives may also be used together with other adhesives. As other adhesives, in the case where the above described isocyanate adhesives are aqueous dispersion isocyanate adhesives, polyvinyl alcohol adhesives, gelatin adhesives, vinyl derived latex adhesives, aqueous polyesters, etc. may be mentioned.

The above described adhesives are usually used as adhesives comprising aqueous solution, and usually include 0.5 to 60% by weight of solid content.

A polarizing plate of the present invention is manufactured by laminating the applied layer of the transparent protective film, in which the applied layer is formed with the above described polymer having hydroxyl groups, and a polarizer using the above described isocyanate adhesives. Application of isocyanate adhesives may be performed to either of the transparent protective film and the polarizer, and it may be performed to both of them. After laminating, drying process is given and an adhesive layer comprising an applied dry layer is formed. A roll laminator etc may conduct laminating procedure of the polarizer and the transparent protective film. Although a thickness of an adhesive layer is not especially limited, it is usually approximately 0.1 to 5 µm.

The polarizing plate of the present invention may be used in practical use as an optical film laminated with other optical layers. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness maybe controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and maybe a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multilayered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives maybe preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethylacetate or a mixed solvent of these two solvents is prepared. A method in which this solution is directly applied on a polarizing plate top or a optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 $\mu$m, preferably 5 to 200 $\mu$m, and more preferably 10 to 100 $\mu$m.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, $\pi$ type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Hereinafter, the constitution and effect of the present invention are described in more detail by reference to the Examples. In the Examples, parts and % are expressed on a weight basis.
(Preparation of a Polarizer)

A polyvinyl alcohol film of 80 $\mu$m in thickness was dying in 0.3% aqueous iodine, stretched 5 times in 4% aqueous boric acid and 2% aqueous potassium iodide, and then dried at 50° C. for 4 minutes to give a polarizer.

Example 1

Preparation of a Transparent Protective Film

A solution comprising ethylene-vinyl alcohol copolymer 5% and dimethylacetamide 95% was applied to one side of a triacetyl cellulose film (referred to as TAC film, hereinafter) with a thickness of 80 $\mu$m, then dried for 5 minutes at 120° C., and an applied layer was formed. A thickness of the applied layer after dried showed 0.3 $\mu$m.
(Preparation a Polarizing Plate)

After an isocyanate adhesive currently in which an isocyanate derived resin (brand name: AQUANATE 100, manufactured by NIPPON POLYURETHANE INDUSTRY CO., LTD.) 20 parts is dispersed in water 80 parts was applied on an applied layer of the above described transparent protective film, the applied film was adhered onto both sides of a polarizer using a roll laminator, and subsequently they were dried for 10 minutes at 60° C. Subsequently, it was cured at 40° C. for 72 hours, and a polarizing plate was obtained. A thickness of an adhesive layer showed 0.2 $\mu$m.

Example 2

Except that an adhesive in which an isocyanate resin (brand name: AQUANATE 100, manufactured by NIPPON POLYURETHANE INDUSTRY CO., LTD.) 5 parts was dispersed in water 75 parts, and furthermore aqueous polyester resin (brand name: Vylonal MD-1100, manufactured by Toyobo Co., Ltd.) 20 parts was mixed was used in the example 1 (wherein preparation of a polarizing plate), a polarizing plate was prepared according to the example 1 (wherein preparation of a polarizing plate).

Example 3
(Preparation of a Transparent Protective Film)

A solution comprising ethylene-vinyl alcohol copolymer 5% and dimethylacetamide 95% was applied to one side of a norbornene film with a thickness of 50 μm (ARTON manufactured by JSR, and optical elasticity coefficient: $5\times10^{-12}$ m$^2$/N), and was dried for 5 minutes at 120° C., to form an applied layer. After dried, a thickness of an applied layer showed 0.3 μm.

(Preparation of a Polarizing Plate)

After an isocyanate adhesive in which an isocyanate resin (brand name: AQUANATE-100, manufactured by NIPPON POLYURETHANE INDUSTRY CO., LTD.) 20 parts was dispersed in water 80 parts was applied to an applied layer of the above described transparent protective film, the applied film was adhered onto both sides of a polarizer using a roll laminator, and subsequently they were dried for 10 minutes at 60° C. Subsequently, it was cured at 40° C. for 72 hours, and a polarizing plate was obtained. A thickness of an adhesive layer showed 0.2 μm.

Example 4

Except that an adhesive in which an isocyanate resin (brand name: AQUANATE 100, manufactured by NIPPON POLYURETHANE INDUSTRY CO., LTD.) 5 parts was dispersed in water 75 parts, and furthermore aqueous polyester resin (brand name: Vylonal MD-1100, manufactured by Toyobo Co., Ltd.) 20 parts was mixed was used in the example 3 (wherein preparation of a polarizing plate), a polarizing plate was prepared according to the example 3 (wherein preparation of a polarizing plate).

Comparative Example 1

Except for having used a TAC film on which an applied layer by an ethylene-vinyl alcohol copolymer was not prepared in the example 1 (wherein preparation of a polarizing plate) as the above described transparent protective film, a polarizing plate was prepared according to the example 1 (wherein preparation of a polarizing plate).

Comparative Example 2

Except having used a polyvinyl alcohol adhesive comprising polyvinyl alcohol 4 parts, melamine 1 part and water 95 parts, instead of an isocyanate adhesive of the example 1 (wherein preparation of a polarizing plate), a polarizing plate was prepared according to the example 1 (wherein preparation of a polarizing plate).

Comparative Example 3

Except having used a norbornene film on which an applied layer by ethylene-vinyl alcohol copolymer was not prepared, as an above described transparent protective film, in the example 3 (wherein preparation of a polarizing plate), a polarizing plate was prepared according to the example 3 (wherein preparation of a polarizing plate).

Comparative Example 4

Except having used the polyvinyl alcohol derived adhesive comprising polyvinyl alcohol 4 parts, melamine 1 part and water 95 parts instead of an isocyanate adhesive in the example 3 (wherein preparation of a polarizing plate), a polarizing plate was prepared according to the example 3 (wherein preparation of a polarizing plate).

Comparative Example 5

Except that a film in which a TAC film with a thickness of 80 μm was saponified for 3 minutes at 60° C. as the above described transparent protective film was used, and that a polyvinyl alcohol adhesive comprising polyvinyl alcohol 4 parts, melamine 1 part and water 95 parts was used instead of an isocyanate adhesive in the example 1 (wherein preparation of a polarizing plate), a polarizing plate was prepared according to the example 1 (preparation of a polarizing plate).

<Adhesive Strength>

Samples cut into 25 mm width from polarizing plates obtained in the examples and in the comparative examples were measured for adhesive strength when a transparent protective film was peeled from a polarizing plate under conditions of tensile speed of 300 mm/min, at ordinary temperature (25° C.), and with peeling angle of 180° using a tensile testing machine. At this time, a sample in which adhesion was strong to give a result of fracturing of a transparent protective film without peeling was represented to be "break". Results are shown in Table 1.

<Water Resisting Property>

Polarizing plates obtained in the examples and in the comparative examples were cut into rectangle having a long side of 50 mm and short side of 25 mm so that an stretched direction of a polarizer might make a long side, and a state of separation after the samples were dipped in 60° C. water for 8 hours was visually observed. Results are shown in Table 1.

<Moistureproof Resistance>

Polarizing plates obtained in the examples and in the comparative examples were cut into rectangle having a long side of 50 mm and short side of 25 mm so that an stretched direction of a polarizer might make a long side, and these were adhered onto slide glass using acrylic pressure sensitive adhesive. After initial characteristics were observed, they were left in a humidistat kept at constant condition of temperature of 60° C./95% RH. They were removed out after 8-hour progress and state of discoloration or a separation were visually observed. Results are shown in Table 1.

TABLE 1

|  | Adhesive strength (N/25 mm) | Water resisting property | Moistureproof resistance |
| --- | --- | --- | --- |
| Example 1 | Break | No separation | No separation and no discoloration |
| Example 2 | Break | No separation | No separation and no discoloration |
| Example 3 | Break | No separation | No separation and no discoloration |
| Example 4 | Break | No separation | No separation and no discoloration |
| Comparative example 1 | 0.2 | No separation | Separation from circumference and discoloration |

TABLE 1-continued

| | Adhesive strength (N/25 mm) | Water resisting property | Moistureproof resistance |
|---|---|---|---|
| Comparative example 2 | 0.8 | Whole surface separation | Separation from circumference and discoloration |
| Comparative example 3 | 0.05 | Separation from circumference | No separation and no discoloration |
| Comparative example 4 | 0.01 | Separation of protective film | No separation and no discoloration |
| Comparative example 4 | Break | Whole surface separation | Separation from circumference and discoloration |

As is shown in Table 1, it is recognized that a polarizing plate, comprising a transparent protective film (a TAC film, norbornene derived film) in which an applied layer comprising a polymer (ethylene-vinyl alcohol copolymer) having a hydroxyl groups was prepared, has a high adhesive strength and water resisting property even if an alkali treatment is not given.

What is claimed is:

1. A polarizing plate comprising a polarizer and a transparent protective film adhered to at least one surface of the polarizer via an adhesive layer,
    wherein an applied layer comprising a polymer having a hydroxyl group is formed on a surface of the transparent protective film that is adhered to the polarizer, and
    the adhesive layer is formed by an adhesive comprising an isocyanate adhesive, such that no isocyanate adhesive is in contact with the protective film.

2. The polarizing plate according to claim 1, wherein the transparent protective film is a triacetyl cellulose film.

3. The polarizing plate according to claim 1, wherein the transparent protective film has an optical elasticity coefficient of $30 \times 10^{-12}$ m$^2$/N or less.

4. The polarizing plate according to any of claims 1 to 3, wherein the polymer having the hydroxyl group is an ethylene-vinyl alcohol copolymer.

5. The polarizing plate according to any of claims 1 to 3, wherein the applied layer comprising the polymer having the hydroxyl group is formed by a polymer solution or a dispersion containing a solvent dissolving a material of the transparent protective film.

6. The polarizing plate according to any of claims 1 to 3, wherein the isocyanate adhesive is an aqueous dispersion isocyanate adhesive.

7. A method for manufacturing the polarizing plate according to any of claims 1 to 3, which comprises a polarizer and a transparent protective film adhered to at least one surface of the polarizer via an adhesive layer, comprising;
    forming an applied layer comprising a polymer having a hydroxyl group on a surface of the transparent protective film that is adhered to the polarizer, and
    laminating the applied layer and the polarizer by using an isocyanate adhesive, such that no isocyanate adhesive is in contact with the protective film.

8. A protective film for a polarizing plate used for the polarizing plate according to any of claims 1 to 3,
    wherein an applied layer comprising a polymer having a hydroxyl group is formed on a surface of the transparent protective film that is adhered to the polarizer.

9. An optical film comprising at least one sheet of the polarizing plate according to any of claims 1 to 3.

10. A visual display comprising the polarizing plate according to any of claims 1 to 3.

11. The polarizing plate according to any of claims 1 to 3, wherein a thickness of the adhesive layer is from about 0.1 to about 5 μm.

12. The polarizing plate according to any of claims 1 to 3, wherein a thickness of the applied layer is from about 0.01 to about 10 μm.

13. The polarizing plate according to any of claims 1 to 3, wherein a thickness of the applied layer is about 0.05 to about 5 μm.

14. The polarizing plate according to any of claims 1 to 3, wherein a thickness of the applied layer is about 0.1 to about 1 μm.

15. The polarizing plate according to any of claims 1 to 3, wherein the applied layer contains no isocyanate.

16. The polarizing plate according to any of claims 1 to 3, wherein the isocyanate adhesive-containing adhesive layer is a single layer between the polarizer and the protective film.

17. The polarizing plate according to any of claims 1 to 3, wherein the applied layer is in direct contact with the protective film.

18. The polarizing plate according to claim 17, wherein a layer in which the transparent protective film material and the polymer having hydroxyl groups are mixed is formed in the surface of the protective film.

19. The method according to claim 7, wherein the isocyanate adhesive-containing adhesive layer is a single layer between the polarizer and the protective film.

20. The method according to claim 7, wherein the applied layer is in direct contact with the protective film.

21. The method according to claim 7, wherein a layer in which the transparent protective film material and the polymer having hydroxyl groups are mixed is formed in the surface of the protective film.

* * * * *